Figure 1:
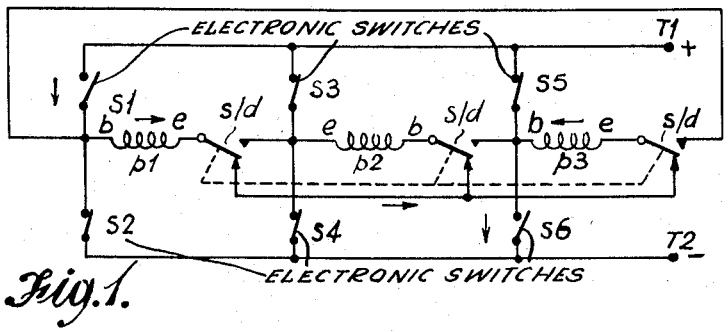

United States Patent Office 3,229,179
Patented Jan. 11, 1966

3,229,179
DYNAMO-ELECTRIC MACHINE WITH COMMUTATION BY SCR'S OR THE LIKE
Peter John Grenville Hetzel, Cawston, Rugby, England, assignor to Associated Electrical Industries Limited, London, England, a company of Great Britain
Filed Jan. 11, 1962, Ser. No. 165,597
Claims priority, application Great Britain, Jan. 19, 1961, 2,223/61
3 Claims. (Cl. 318—138)

This invention relates to dynamo-electric machines having commutating switching by means of electronic switching devices, for instance semi-conductor switching devices such as transistors or so-called trigger diodes, which control the direction and timing of current flow in the armature conductors of the machine, being to this end arranged to be alternated between conductive "on" states and substantially non-conductive "off" states in synchronism with operation of the machine and with a timing and in a sequence appropriate to producing, in the individual armature conductors, periodic current flow in appropriate direction having regard to the instantaneous positions of these conductors in relation to the magnetic field poles of the machine. In general, the function of the switching devices as thus provided and controlled is to provide that, as with ordinary mechanical commutators, the direction of current flow through an armature conductor is reversed as the conductor is moving out of the influence of one field pole towards that of the next field pole of opposite polarity.

Our copending application Serial No. 60,881 concerns a commutating switching arrangement which is provided in combination with a dynamo-electric machine having a plurality of armature current paths each comprising a plurality of armature conductors so disposed that these paths, each considered as a whole, will pass between poles at different times. The commutating switching arrangement of said application comprises a plurality of semi-conductor switching devices arranged for operation in pairs, the operation of a pair consisting of substantially instantaneous reversal of the states of the devices of the pair, the one from an existing "on" state to the "off" state and the other conversely. Each switching device may be included in a different pair at different times. Under the control of timing means operating synchronously with operation of the machine, the switching devices are operated with such pairing and with such timing that, at such times as any particular armature conductor path is passing between poles, that path becomes reconnected for reverse direction of current flow through it. This current reversal in any particular path may require simultaneous operation of two different pairs of switching devices or may involve the operation of two pairs successively: for instance the operation of one pair of switching devices may reduce or interrupt the current flow in a particular path and the next operation of another pair of the devices may re-stablish full current flow in the opposite direction in that path. The arrangement of the armature current paths in relation to each other and to the switching devices is such that the reconnection of a path for reverse current flow is effected without establishing between the armature terminals of the machine for any significant interval a series-connection of armature conductors which includes only such conductors as belong to the path then passing between poles and therefore have little or no E.M.F. produced in them to oppose the voltage at the armature terminals. As explained in our said copending application, it therefore becomes possible to arrange the switching devices for operation as bistable pairs in which the states of the devices constituting a pair are reversed substantially instantaneously without any significant intervening period in which both devices are "off" together, the timing requirements for operating such bistable pairs being more easily met than would otherwise be the case.

In one of several embodiments described and claimed in our said copending application, the armature current paths of the machine are connected, circuit-wise, in a closed chain (there being an odd number of such paths) and each junction point between adjacent paths in the chain has two semi-conductor switching devices connected respectively between it and the armature terminals. Each such switching device, according to the particular junction point and armature terminal between which it is connected, is connected for timed, paired, operation with one and the other, at different times, of those switching devices which are correspondingly and respectively connected between the same armature terminal and the two adjacent junctions in the chain: the switching devices are arranged for their paired operations in such a sequence that at any time both the devices associated with one junction in the chain are in their "off" states, while one of the switching devices associated with each other junction is in its "on" state, the "on" devices at successive ones of said other junctions being alternately on the one side and the other of these junctions with respect to the armature terminals. The action of successive switching operations is that, as regards any particular armature path, it is connected directly across the armature terminals while within the influence of a particular field polarity, is switched into series with the armature path adjacent to it in the chain on the one side for the initial part of its transition from one field polarity to the other (this adjacent path being within the influence of the field poles at this time), is switched with reverse direction of current flow into series with the other adjacent armature path (namely that on the other side) for the latter part of the transition, and is then reconnected, in said reverse direction, directly between the armature terminals, being now within the influence of the opposite field polarity.

The closed chain circuit configuration just described for the armature paths corresponds to a delta connection if there are three armature paths and to an analogous closed connection if there is some greater, odd, number of paths.

The present invention relates to an arrangement according to which the armature paths, again an odd number, are interconnected in what corresponds to a "star" connection, possibly wtih change-over switching means (as distinct from the commutating switching means) by which the machine can be switched from this "star" connection to a delta or analogous connection. According to the invention, each of the armature paths as connected or connectible in this star configuration has its "free" end, namely that opposite to its end which is connected to the star point, connected individually to the armature terminals of the machine through respective electronic switching devices which preferably but not essentially are semi-conductor devices as in our said copending application. Considering the paths in cyclic sequence, each switching device is arranged, according to the particular path and terminal which it interconnects, for bistable paired operation with one and the other, at different times, of those switching devices which respectively interconnect the same armature terminal with the immediately preceding and succeeding paths in said cyclic sequence, such paired operations of the switching devices being brought about through appropriate cross-connections between them and being initiated in a timed sequence such that at any time both of the devices associated with one path are in their "off" state while one of the devices associated with each of the other paths is in its "on" state, the "on" devices being connected to the one terminal and to the other alternately in the sequence of armature paths.

Figure 2:
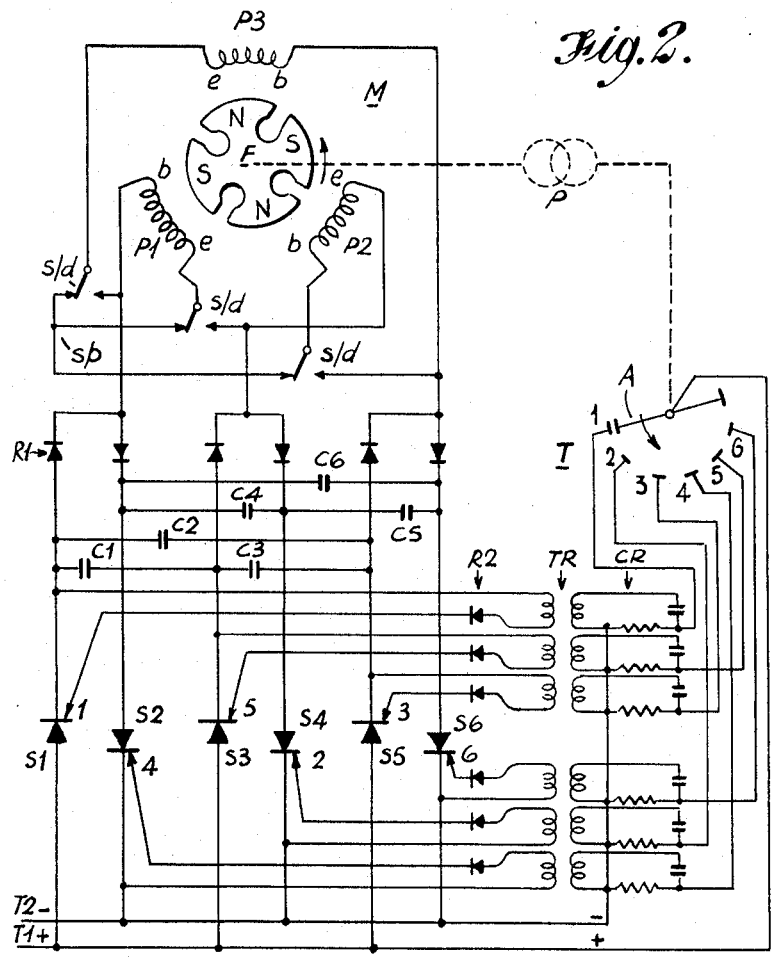

The nature of the invention and the results of the paired operation of the switching devices may be more fully and easily understood by consideration of the accompanying drawing of which FIG. 1 illustrates in schematic form, and FIG. 2 in a more detailed form, respective embodiments of the invention for a machine with three armature current paths switchable between star and delta configurations.

Referring to the drawing, the coils p1, p2 and p3 represent respective armature paths each constituted by a plurality of armature conductors (not separately shown) lying in peripherally distributed armature slots (also not shown) and interconnected in wave-wound formation over pole pitches, that is, the successive conductors constituting the path are a pole apart. The conductors constituting the several paths p1, p2 and p3 are regularly interspersed among themselves (the totality of conductors being equally distributed round the armature) so that the conductors constituting any particular path will all be passing between poles at the same time but at different times from the conductors of the other paths. Thus when any one path, considered as a whole, is midway between poles, the other paths are within the influence of poles. The beginnings and ends of the paths are marked b and e respectively.

A star/delta change-over switch having change-over contacts s/d connects the paths p1, p2 and p3 in star formation in its position shown and in delta formation in its other position. Referring to FIG. 1 and considering the star formation, one end of each path is connected via contacts s/d to a star point sp and the other end of the path is connected to the positive and negative armature terminals T1 and T2 via respective switching devices s1 and s2 for path p1, s3 and s4 for path p2, and s5 and s6 for path p3. These switching devices have been conventionally represented as contacts in FIG. 1 but they are in fact constituted by electronic switching devices such as transistors or trigger diodes (SCR's). Reference may be had to my aforesaid copending application for a fuller description of the nature of these devices and of the mode of controlling them: it is sufficient here to say that they are semi-conductor devices which, by the application of an appropriate controlling potential, can be switched between a substantially non-conductive "off" state in which they pass negligible current and a conductive "on" state in which they present a low impedance to current flow through them. The controlling potentials can be applied under the control of any suitable timing arrangement operating in synchronism with the machine, the sequence and timing being determined according to the following considerations.

At any time, the two switching devices associated with one path are both in their "off" state, while of the two devcies associated with each other path one of them is in its "off" state and the other in its "on" state. Also, considering the paths in their cyclic sequence p1, p2, p3, p1 ... in either direction, the "on" devices are alternately on the positive terminal side and the negative terminal side. Thus if the switching devices s3 and s4 associated with path p2 are "off" and device s1 associated with path p1 on the positive terminal side is "on," then the device s6 associated with path p3 on the negative terminal side will also be "on," devices s2 and s5 being "off". As can be seen by studying the drawing, current will in these circumstances tend to flow in series through path p1 (beginning-to-end) and path p3 (end-to-beginning), with no current flowing through path p2. Each timed switching action of the switching devices s1 ... s6 is such as to operate as a bistable pair, and thereby to reverse the states of, the "on" device associated with that path which is next in sequence, in a particular direction, to that for which both switching devices are "off," and that one of these latter "off" devices which is connected to the same armature terminal. For example if devices s1 and s6 are in their "on" states, the others being "off," then according to the direction of operation of the machine the next switching action will be arranged to reverse the states of, say devices s6, which goes "off," and s4, which comes "on." As as result, current now flows through the path which was previously without current (p2) in series with one of the other paths (p1), and no longer flows in the path (p3) for which both switching devices s5 and s6 are now "off." The next timed switching action reverses the state of a pair of the devices following the same rule, so that continuing the same example, devices s1 and s5 would next be reversed in state, s1 going "off" and s5 coming "on." A complete sequence of operations based on this same example is given in Table I below, in which the direction of current flow in a path is indicated as b–e (beginning-to-end), e–b (end-to-beginning) or O (insignificant).

Table I

| Devices "on" | "Star" Current flow | | |
|---|---|---|---|
| | p¹ | p² | p³ |
| s1 s6 | b–e | O | e–b |
| s1 s4 | b–e | b–e | O |
| s5 s4 | O | b–e | b–e |
| s5 s2 | e–b | O | b–e |
| s3 s2 | e–b | e–b | O |
| s3 s6 | O | e–b | e–b |
| s1 s6 | b–e | O | e–b |

It will be noted that, as regards each path, its current is periodically substantially switched off (O) and is subsequently re-established in the opposite direction to that which it had previously, this action occurring in sequence with the other paths. The timing of the switching actions is such that the current in a path is reversed in this way, with an intervening "off" period, at such time as the path is passing between poles. The arrow-headed brackets in Table I indicate the successive switching actions on the one hand and the reversal of current flow in the armature current paths on the other hand. The underlining of the symbols b–e and e–b indicates that the current flow which they represent takes place through two paths in series.

The arrangement can be extended to a greater (odd) number of armature paths, the same general considerations regarding the connections and the timing and sequence of operations of the switching devices being equally applicable with such greater number.

By operating the change-over switch to reverse the positions of its contact s/d, the armature paths p1, p2 and p3 (and the other paths if there is some greater number) are connected into a closed chain in which each junction point between adjacent paths in the chain is connected to the two armature terminals T1 and T2 through respective switching devices such as s1 and s2 for the junction between paths p1 and p3: with three paths as shown, the connection now corresponds to a "delta" configuration, and the circuit is similar to that of FIG. 6 of our said copending application. With this closed chain connection the switching devices s1 ... s6 are arranged to be switched in pairs in the same sequence and with the same timings relatively to each other as for the star arrangement. Starting with devices s1 and s6 in thier "on" states, as before, examination of the drawing shows that current will then tend to flow through path p3 (end-to-beginning) directly between the terminals T1 and T2, and through paths p1 (beginning-to-end) and p2 (end-to-beginning) in series with each other. If, again as before, the next switching action reverses the states of switching devices s4 and s6, the current flow is then through path p1 directly (beginning-to-end) and through paths p2 (beginning-to-end) and p3 (end-to-beginning) in series, the direction of the current in path p2 having been reversed. The next switching action, by reversing the states of devices s1 and s5, results in the current flow being through path p2 directly (beginning-to-end) and through paths p1 (beginning-to-end) and p3 (end-to-beginning, i.e. reversed) in series. Table II shows a complete sequence: underlining of the symbols b–e and e–b indicates current flow in series with another path, while the absence of such underlining indicates that the path concerned is connected directly across the armature terminals.

*Table II*

| "Delta" | | | |
|---|---|---|---|
| Devices "on" | Current flow | | |
|  | p¹ | p² | p³ |
| s1  s6 | _b-e_ | e-b | e-b |
| s1↓ s4 | b-e | _b-e_ | e-b |
| s5  s4↓ | b-e | b-e | _b-e_ |
| s5↓ s2 | _e-b_ | b-e | b-e |
| s3  s2↓ | e-b | _e-b_ | b-e |
| s3↓ s6 | e-b | e-b | _e-b_ |
| s1  s6 | _b-e_ | e-b | e-b |

It will be noted in this case that, immediately before and immediately after the direction of current in any path is reversed, that path is temporarily connected in series with another path. The current reversal is timed to take place when the path is midway between poles and the temporary series connection of another path, which will still be within the influence of a pole and therefore producing an E.M.F., ensures that there is at no time a direct connection across the terminals of a path which is between poles and therefore producing little or no E.M.F. to oppose the terminal voltage. This is also ensured with the star connection previously described, by reason of the fact that the path which is between poles at any time is in effect temporarily switched out of circuit.

In switching from the star arrangement to the closed chain (delta) arrangement the timing of the switching actions requires to be changed in phase, with respect to the movement of the armature paths past the poles, by a phase angle which can be shown to be (180/2n) degrees electrical, where n is the number of armature paths. Thus where there are three paths as in the illustrated example, a phase adjustment of 30° (electrical) has to accompany the change-over from star-to-delta and vice versa. This can readily be achieved in any convenient manner, requiring only an appropriate adjustment of the timing means relatively to the machine or an appropriate reconnection of the leads over which the operating potentials for the switching devices are sequentially applied to them from the timing means.

The switching devices may be cross-connected for their paired operation in any convenient manner and various ways of doing so will be apparent to those versed in electronic switching art, in which various forms of bistable connections of electronic switching devices are well known. FIG. 2 illustrates one possible arrangement employing trigger diodes.

In FIG. 2, which is again somewhat schematic, the armature paths P1, P2 and P3 have been represented as being on the stator of a dynamo-electric machine M having a rotor field system F. With an electromagnetic field system this arrangement reduces the number of slip-rings required as compared with a rotor armature arrangement: with a permanent magnet field system no slip-rings are required.

The armature paths P1, P2, P3 are interconnected with star/delta change-over contacts s/d and trigger diode switches devices S1 . . . S6 in a manner which on examination will be seen to correspond to the interconnection in FIG. 1. An appropriately poled rectifier R1 is connected in series with each switching device, and the switching devices are paired, in the manner and for the purpose previously described, by means of cross-connecting capacitors C1 . . . C6. As is known, a trigger diode can be rendered conductive by an appropriate operating potential applied to its trigger electrode, and will remain conductive, even after removal of the operating potential, until the voltage across the diode is removed or reduced below a critical value. In the present arrangement, the action of the capacitors C1 . . . C6 is that when any of the trigger diodes is fired (i.e. rendered conductive), a resulting change of potential at its junction with the series rectifier (R1) is transmitted via the capacitors connected to that junction to each of the trigger diodes which are paired with the fired diode through these capacitors. This change of potential so reduces the voltage across such other diode as to extinguish it if previously conducting. For instance if diode S1 was originally conducting, then when diode S5 is fired by an appropriate potential applied to its trigger electrode, the coupling afforded by capacitor C2 will cause diode S1 to extinguish. Diodes S1 and S5 are therefore operated as a bistable pair, as are also in like manner, and in accordance with the requirements of Tables I and II, the diodes S5 and S3, S3 and S1, S6 and S4, S4 and S2, and S2 and S6. It will be noted that the overall cyclic operation of each pair includes a period when both devices of the pair are both "off," in addition to a period when the pair in one stable condition (one device "off," the other "on") and a period when the pair is in its other stable condition (conditions of devices reversed).

For the purpose of illustration, and by way of example only, the timed operation of the trigger diodes has been assumed to be effected under control of timing device T comprising a contact arm A which rotates synchronously with the machine M and engages fixed contacts 1–6 in sequence. As the arm A comes into engagement with a particular contact, a differentiating circuit (CR) connected to this contact produces in the primary winding of a transformer (TR) a pluse which is transferred to the secondary winding and is thereby applied through a rectifier (R2) to the trigger electrode of a particular trigger diode, with a polarity such as to fire this diode. As the arm A rotates, the diodes are thus fired in a particular sequence which, with the connections indicated in FIG. 2, will be that required according to Tables I and II. Provision for changing the phasing of this sequence with respect to the instantaneous angular positions of the rotor of the machine M can be made, for instance, by the inclusion of an angularly adjustable coupling P between the rotor and the arm A.

It will be noted that the arrangement of the switching devices with respect to each other and to the timing device T is similar to that illustrated in FIG. 7 of our aforesaid copending application. The additional refinements included in this latter figure could equally be added to the arrangement of FIG. 2. It will be appreciated that other forms of timing device could be used, the criterion of suitability being the provision of sequential firing pulses of appropriate polarity.

For the star arrangement with which the present invention is basically concerned, the two armature paths which are at any time connected in series between the armature terminals should each preferably develop one half of the armature voltage. Ideally therefore, the E.M.F. waveform generated in each path should be such that the voltage developed in the idle path (that is the one which has temporarily been switched out of circuit) is half the terminal voltage at the instant that it is to be switched back into circuit, while the E.M.F. in the path about to be switched out of circuit is maintained at half the terminal voltage until the instant of switching. The E.M.F. waveform in each path is determined by the disposition of the conductors constituting the path and by the shape of the field flux pattern. In the embodiment described, with fully pitched armature paths and uniform pole gap, a ratio of pole arc to pole pitch of 2:3 will give the required E.M.F. waveform.

With the star arrangement of the armature paths the machine will run at half the speed which it would have with a closed chain (delta) arrangement of the paths. A machine with a star/delta change-over switch may therefore be useful as a two speed machine, although it is contemplated that a more important purpose of such switch would be to allow the machine to be started with its armature paths connected in star configuration then switched over to the closed-chain configuration when a certain speed has been reached. In this way the starting resistance usually required could be reduced or perhaps eliminated. Because two paths are always connected in series across the armature terminals in the star arrangement, with no path directly across the terminals, the back E.M.F. that is produced immediately rotation commences is twice that produced with the closed-chain arrangement so that the current is correspondingly smaller.

What I claim is:

1. In combination with a dynamo-electric machine having two armature terminals, field poles, and an odd number of armature current paths connected in "star" mode, said paths and poles so disposed in relation to each other that considering each path as a whole, it will pass between successive field poles of the machine at different times; commutating switching means for effecting armature current commutation with respect to said two armature terminals, comprising a first plurality of electronic switching devices connected between the free ends of said armature paths and one of the two armature terminals, said first plurality of switching devices connected to conduct current in a first direction, a second plurality of electronic switching devices connected between the free ends of said armature paths and the other of the two armature terminals, said second plurality of switching devices connected to conduct current in the opposite direction to that of the first plurality of switching devices whereby the free end of each path is connected to one armature terminal through a switching device of one polarity and to the second armature terminal through a switching device of opposite polarity, means for cross-connecting each switching device of the first plurality with every other switching device of the first plurality, means for cross-connecting each switching device of the second plurality with every other switching device of the second plurality, each pair of devices thus cross-connected being bistably operable to instantaneously reverse the conductivity states thereof, the one device of the pair from an existing "on" state to the "off" state and the other conversely, together with timing control means operable synchronously with the machine and connected to the switching devices for producing sequential state-reversing of the pairs thereof in a sequence such that an any time both of the devices associated with one path are in an "off" condition while one of the two devices associated with each other path is in an "on" condition, the devices which are "on" at any time being devices which, in sequence corresponding to that of the armature paths, are connected to the one terminal and the other alternately.

2. A dynamo-electric machine combination as claimed in claim 1 including change-over switching means operable to disconnect the star-point ends of the armature paths from the star point and to reconnect that end of each armature path to the other end of the next path whereby to reconnect said paths in closed-chain (delta) mode, together with means for changing the relative time phasing between the sequence of operation of the switching devices pairs on the one hand and the movement of the armature paths of the machine past the poles on the other hand.

3. A dynamo-electric machine combination as claimed in claim 1 wherein the disposition of the armature paths, the flux pattern produced by the field poles, and the relative timing of the operations of the switching device pairs with respect to the instantaneous positions of the armature paths relatively to the field poles, are so related that each path will have a voltage of approximately half the armature terminal voltage developed in it immediately before each operation of a switching device pair which puts both of the devices associated with that path into "off" state and also immediately before each operation which returns one of these two devices to the "on" state.

References Cited by the Examiner
UNITED STATES PATENTS

| | | | |
|---|---|---|---|
| 867,547 | 10/1907 | Yates | 318—226 |
| 3,025,443 | 3/1962 | Wilkinson et al. | 318—138 |
| 3,026,460 | 3/1962 | Fath | 318—226 |
| 3,127,548 | 3/1964 | Van Emden | 318—254 |

ORIS L. RADER, *Primary Examiner.*